US009828270B2

(12) United States Patent
Xia et al.

(10) Patent No.: US 9,828,270 B2
(45) Date of Patent: Nov. 28, 2017

(54) SYSTEMS AND PROCESSES FOR TREATMENT OF SOLUTIONS

(75) Inventors: Jiyang Xia, Shanghai (CN); Rihua Xiong, Shanghai (CN); Wei Cai, Shanghai (CN); Wenqing Peng, Shanghai (CN); Zijun Xia, Shanghai (CN); Yiwen Sun, Shanghai (CN)

(73) Assignee: General Electric Company, Schenectady, NY (US)

( * ) Notice: Subject to any disclaimer, the term of this patent is extended or adjusted under 35 U.S.C. 154(b) by 394 days.

(21) Appl. No.: 13/062,857

(22) PCT Filed: Jul. 2, 2010

(86) PCT No.: PCT/US2010/040877
§ 371 (c)(1),
(2), (4) Date: Mar. 8, 2011

(87) PCT Pub. No.: WO2011/115636
PCT Pub. Date: Sep. 22, 2011

(65) Prior Publication Data
US 2012/0325743 A1    Dec. 27, 2012

(30) Foreign Application Priority Data
Mar. 16, 2010    (CN) .......................... 2010 1 0127151

(51) Int. Cl.
*B01D 11/04*    (2006.01)
*B01D 61/10*    (2006.01)
(Continued)

(52) U.S. Cl.
CPC ............ *C02F 9/00* (2013.01); *B01D 11/0488* (2013.01); *B01D 11/0492* (2013.01);
(Continued)

(58) Field of Classification Search
CPC .... B01D 43/00; B01D 11/0415; B01D 11/04; B01D 11/0492; B01D 11/0288;
(Continued)

(56) References Cited

U.S. PATENT DOCUMENTS 2,710,250 A * 6/1955 Andrews ............ B01D 11/0449
                                                            210/511
3,088,909 A    5/1963 Davison et al.
(Continued)

FOREIGN PATENT DOCUMENTS

| CN | 101654305 A | 2/2010 |
|----|-------------|--------|
| JP | 58130121 A  | 8/1983 |

(Continued)

OTHER PUBLICATIONS

International Search Report and Written Opinion for PCT Application No. US10/40877 filed on Jul. 2, 2010.
(Continued)

*Primary Examiner* — Joseph Drodge

(57) ABSTRACT

A treatment system is provided and comprises a precipitation unit and a recovery unit. The precipitation unit is configured to treat a solution using one or more miscible organic solvents to produce a mixture of precipitate solids and a liquid. The recovery unit is in fluid communication with the precipitation unit and configured to facilitate separating the liquid at least into an organic phase liquid and an aqueous phase liquid comprising a portion of the one or more miscible organic solvents. The treatment system further comprises a purification unit comprising one or more membrane devices in fluid communication with the recovery unit and configured to separate at least a portion of the one or more miscible organic solvents in the aqueous phase liquid from the aqueous phase liquid. A treatment system and a treatment process are also presented.

24 Claims, 2 Drawing Sheets

(51) Int. Cl.
| | | |
|---|---|---|
| *B01D 61/14* | (2006.01) | |
| *B01D 61/58* | (2006.01) | |
| *C02F 1/02* | (2006.01) | |
| *C02F 1/26* | (2006.01) | |
| *C02F 1/42* | (2006.01) | |
| *C02F 1/44* | (2006.01) | |
| *C02F 1/52* | (2006.01) | |
| *C02F 9/00* | (2006.01) | |
| C02F 1/00 | (2006.01) | |
| C02F 1/38 | (2006.01) | |
| C02F 1/469 | (2006.01) | |
| C02F 1/54 | (2006.01) | |
| C02F 1/66 | (2006.01) | |
| C02F 103/08 | (2006.01) | |

(52) U.S. Cl.
CPC ............ *B01D 61/10* (2013.01); *B01D 61/14* (2013.01); *B01D 61/58* (2013.01); *C02F 1/001* (2013.01); *C02F 1/02* (2013.01); *C02F 1/38* (2013.01); *C02F 1/42* (2013.01); *C02F 1/44* (2013.01); *C02F 1/469* (2013.01); *C02F 1/54* (2013.01); *C02F 1/66* (2013.01); *C02F 2103/08* (2013.01)

(58) Field of Classification Search
CPC ........ B01D 61/04; B01D 61/10; B01D 61/16; B01D 61/142; B01D 61/52; B01D 61/58; B01D 2221/04; B01D 2311/04; B01D 2311/12; B01D 11/0419; B01D 11/0488; B01D 17/02; B01D 17/005; B01D 17/06; B01D 61/20; B01D 61/42; B01D 61/422; B01D 2311/2626; B01D 2311/2642; B01D 2311/2669; B01D 2311/2684; B01D 2311/10; B01D 2311/2623; C02F 1/02; C02F 1/44; C02F 1/441; C02F 1/469; C02F 1/4693; C02F 1/447; C02F 1/52; C02F 1/54; C02F 9/00; C02F 9/54; C02F 1/26; C02F 1/42; C02F 1/442; C02F 1/66; E21B 21/06; E21B 21/063; E21B 21/065; E21B 21/068
USPC .... 210/177, 182, 202, 259, 321.6, 511, 638, 210/639, 650, 652, 702, 729, 742, 774, 210/663, 669, 806, 644, 804; 204/518, 204/535, 536, 551, 553, 571, 632, 635, 204/637, 648, 666; 165/308.1; 175/166, 175/206
See application file for complete search history.

(56) References Cited

U.S. PATENT DOCUMENTS

| | | | |
|---|---|---|---|
| 3,177,139 A | 4/1965 | Kimberlin, Jr. et al. | |
| 3,239,459 A | 3/1966 | Patterson | |
| 3,408,290 A | 10/1968 | Scheibel | |
| 3,507,782 A * | 4/1970 | Kurland | B01D 12/00 208/188 |
| 3,823,000 A | 7/1974 | Johnson | |
| 4,261,818 A | 4/1981 | Sweeney | |
| 4,430,227 A | 2/1984 | Hanson et al. | |
| 4,706,749 A | 11/1987 | Hayes et al. | |
| 4,763,607 A | 8/1988 | Tominaga | |
| 4,770,780 A | 9/1988 | Moses | |
| 4,863,607 A | 9/1989 | Andrew et al. | |
| 5,047,153 A | 9/1991 | Nowak et al. | |
| 5,468,394 A | 11/1995 | Bader | |
| 5,562,834 A | 10/1996 | Bremer et al. | |
| 5,587,088 A | 12/1996 | Bader | |
| 5,961,837 A | 10/1999 | Ferrara et al. | |
| 6,365,051 B1 * | 4/2002 | Bader | B01D 61/147 210/640 |
| 6,391,205 B1 * | 5/2002 | McGinnis | B01D 61/002 210/642 |
| 6,398,965 B1 * | 6/2002 | Arba et al. | 210/652 |
| 6,537,456 B2 * | 3/2003 | Mukhopadhyay | 210/652 |
| 7,077,201 B2 | 7/2006 | Heins | |
| 7,442,309 B2 | 10/2008 | Wilf et al. | |
| 7,501,065 B1 | 3/2009 | Bader | |
| 7,578,345 B2 | 8/2009 | Minnich et al. | |
| 7,722,773 B2 | 5/2010 | Honji et al. | |
| 7,963,338 B1 | 6/2011 | Bader | 166/371 |
| 8,105,488 B2 * | 1/2012 | Shafer et al. | 210/605 |
| 2005/0098504 A1 | 5/2005 | Manz et al. | |
| 2005/0145568 A1 * | 7/2005 | McGinnis | B01D 61/002 210/639 |
| 2006/0144789 A1 * | 7/2006 | Cath et al. | 210/641 |
| 2006/0289359 A1 | 12/2006 | Manek et al. | |
| 2011/0046787 A1 * | 2/2011 | Booth | 700/271 |
| 2011/0108481 A1 | 5/2011 | Bajpayee et al. | |
| 2011/0180479 A1 * | 7/2011 | Cordatos | B01D 61/364 210/640 |
| 2011/0253634 A1 * | 10/2011 | Soane et al. | 210/680 |
| 2012/0267307 A1 * | 10/2012 | McGinnis | B01D 61/002 210/638 |

FOREIGN PATENT DOCUMENTS

| | | |
|---|---|---|
| WO | 9222504 A1 | 12/1992 |
| WO | 2009060424 A1 | 5/2009 |

OTHER PUBLICATIONS

Zijlema et al., "Antisolvent Crystallization as an Alternative to Evaporative Crystallization for the Production of Sodium Chloride", Ind. Eng. Chem. Res. 2000, vol. No. 39, pp. 1330-1337, 2000.

Sabate et al., "Influence of pH and Operation Variables on Biogenic Amines Nanofiltration", Separation and Purification Technology, vol. No. 58, pp. 424-428, 2008.

Unofficial English Translation of Chinese Office Action issued in connection with related CN Application No. 201010526996.1 dated Mar. 4, 2013.

Non-final Office Action issued in connection with related U.S. Appl. No. 13/275,485 dated Nov. 3, 2014.

Final Office Action issued in connection with related U.S. Appl. No. 13/275,485 dated May 20, 2015.

\* cited by examiner

SYSTEMS AND PROCESSES FOR TREATMENT OF SOLUTIONS

CROSS REFERENCE TO RELATED APPLICATIONS

This Application claims priority and benefit of CN Patent Application Serial No. 201010127151.5 filed Mar. 16, 2010 and the International Patent Application Serial No. PCT/US2010/40877 filed on Jul. 2, 2010, entitled "SYSTEMS AND PROCESSES FOR TREATMENT SOLUTIONS," which is herein incorporated by reference in its entirety.

BACKGROUND

This invention relates generally to systems and processes for treatment of solutions. More particularly, the invention relates to systems and processes for treatment of aqueous saline solutions using miscible organic solvents.

In industrial processes, large amounts of solutions, such as saline solutions are produced. Generally, such aqueous saline solutions are not suitable for direct consumption in domestic or industrial applications. In view of the limited eligible water sources and protection of environment, some treatment processes, such as de-ionization and desaltification for treatment of wastewater, seawater or brackish water, become options to produce eligible water.

In current applications, various treatment processes, such as distillation, vaporization and chemical precipitation are employed for treatment of solutions. However, such processes can suffer from low efficiency and/or high-energy consumption, for example, for directly treating high saline solutions, such as fracturing water, which may prohibit them from being widely implemented.

Therefore, there is a need for new and improved systems and methods for treatment of aqueous saline solutions, such as fracturing water.

BRIEF DESCRIPTION

A treatment system is provided in accordance with one embodiment of the invention. The treatment system comprises a precipitation unit and a recovery unit. The precipitation unit is configured to treat a solution using one or more miscible organic solvents to produce a mixture of precipitate solids and a liquid. The recovery unit is in fluid communication with the precipitation unit and configured to facilitate separating the liquid at least into an organic phase liquid and an aqueous phase liquid comprising a portion of the one or more miscible organic solvents. The treatment system further comprises a purification unit comprising one or more membrane devices in fluid communication with the recovery unit and configured to separate at least a portion of the one or more miscible organic solvents in the aqueous phase liquid from the aqueous phase liquid.

A treatment system is provided in accordance with another embodiment of the invention. The treatment system comprises a precipitation. unit and a recovery unit. The precipitation unit is configured to treat a solution using one or more miscible organic solvents to produce a mixture of precipitate solids and a liquid. The recovery unit is in fluid communication with the precipitation unit and configured to facilitate separating the liquid at least into an organic phase liquid and an aqueous phase liquid comprising a portion of the one or more miscible organic solvents. The treatment system further comprises a removal device comprising an ionization source and a purification unit in fluid communication with the recovery unit. The ionization source is configured to provide one or more ionization materials to ionize at least a portion of the one or more organic solvents in the aqueous phase liquid. The removal device is configured to receive the aqueous phase liquid to separate at least a portion of the one or more ionized miscible organic solvents from the aqueous phase liquid.

Another aspect of the invention further comprises a treatment process. The treatment process comprises treating a solution using one or more miscible organic solvents to produce a mixture of precipitate solids and a liquid, separating the liquid at least into an organic phase liquid and an aqueous phase liquid comprising a portion of the one or more miscible organic solvents, and introducing the aqueous liquid into one or more of one or more membrane devices and one or more ion removal devices to separate at least a portion of the one or more miscible organic solvents in the aqueous phase liquid from the aqueous phase liquid.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION OF THE INVENTION

Embodiments of the present disclosure are described herein with reference to the accompanying drawings. In the subsequent description, well-known functions or constructions are not described in detail to avoid obscuring the disclosure in unnecessary detail. As used herein, the singular forms "a," "an" and "the" include plural referents unless the context clearly dictates otherwise.

Figure 1:
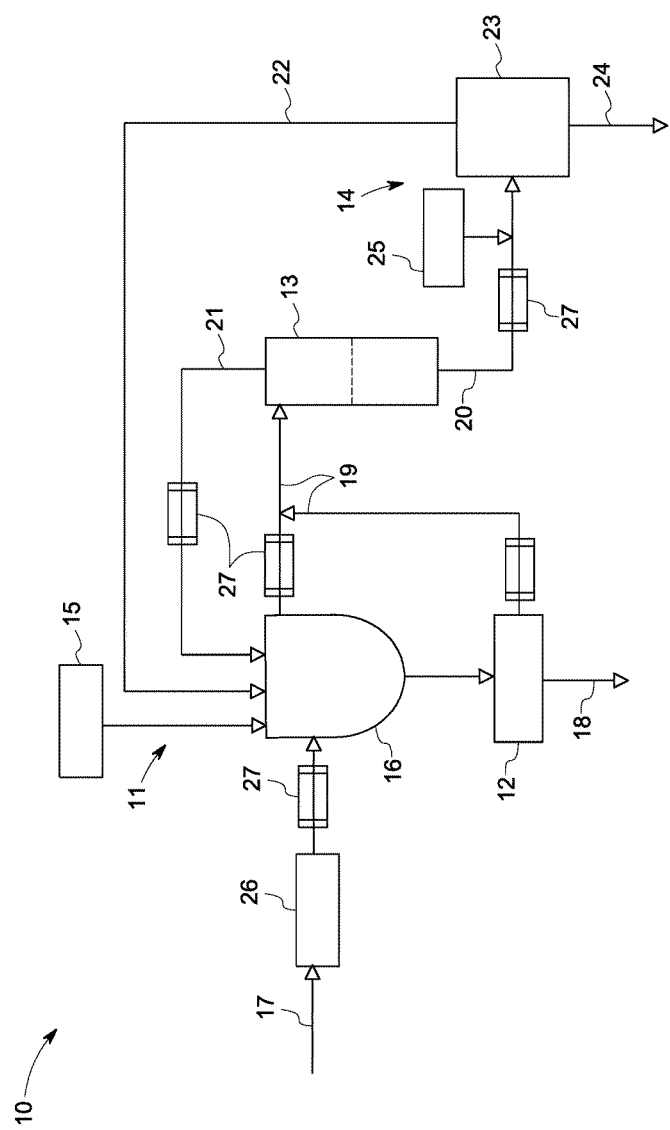
FIG. 1 is a schematic diagram of a treatment system for treating solutions in accordance with one embodiment of the invention.

FIG. 1 is a schematic diagram of a treatment system 10 for treating a solution 17. In non-limiting examples, the solution 17 may comprise any saline solution or water. In some applications, the saline solution may comprise, but not limited to, any liquid having a salt content of at least about 2000 ppm of total dissolved salts (TDS). In other applications, the saline solution may comprise, but not limited to, any liquid having a salt content larger than about 10,000 ppm TDS. In one non-limiting example, the saline water comprises fracturing water.

In embodiments of the invention, the treatment system 10 is configured to perform the treatment, such as precipitation of salt species in the solution 17 via using one or more miscible organic solvents to reduce concentrations of the salt species to produce product water. It should be noted that the miscible organic solvent is not limited to any particular miscible organic solvent, and may be selected based on different applications.

In some applications, the miscible organic solvent may comprise amine. In one example, the amine has the formula (a):

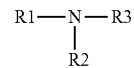

Alternatively, the miscible organic solvent may have the formula (b):

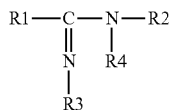

In the formulas (a) and (b), wherein R1, R2 and R3 may be same or different and may be independently selected from the group consisting of saturated or unsaturated, branched or unbranched, substituted or unsubstituted, linear or cyclic C1-C14 hydrocarbons including or not including heteroatoms.

In some examples, one or more of R1, R2 and R3 may comprise methyl, ethyl, n-propyl, isopropyl, 2-methylhexyl, octyl, benzyl and phenyl. The miscible organic solvent may include isopropylamine, propylamine, acetone, methanol, ethanol, acetonitrile, diisopropylamine, tetrahydrofuran, dioxane, tetrahydropyrimidine (THP), N-methyltetrahydropyrimidine (MTHP) and combinations thereof. In one example, the miscible organic solvent comprises diisopropylamine.

Additionally, non-limiting examples of the salt species in the solution 17 include salts selected from the group consisting of halides of sodium, calcium, barium, strontium, and radium, bicarbonates of sodium, potassium, magnesium, calcium, barium, strontium, and radium, silicates of sodium, potassium, magnesium, and radium, selenites, selenates, selenides of sodium, potassium, magnesium, calcium, barium, strontium, and radium, selenide salts selected from the group consisting of phosphorous sub-selenide, phosphorous monoselenide, phosphorous tri-selenide, and phosphorous penta-selenide, selenium halide salts selected from the group consisting of selenium mono-chloride, selenium tetra-chloride, selenium mono-bromide, and selenium tetra-bromide, phosphates of sodium, potassium, magnesium, calcium, barium, strontium, and radium, boron salts of sodium, potassium, magnesium, calcium, barium, strontium, and radium, sulfate salts of sodium, potassium and radium, carbonate salts of sodium, potassium and magnesium, and combinations thereof.

As illustrated in FIG. 1, the treatment system 10 comprises a precipitation unit 11, a solid-liquid separation unit 12, a recovery unit 13 and a purification unit 14, The precipitation unit 11 comprises an organic solvent source 15 and a precipitation device 16. In some embodiments, the organic solvent source 15 is configured to provide the miscible organic solvent. The precipitation device 16 may comprise a vessel and is configured to accommodate the solution 17 from a solution source (not shown) and the miscible organic solvent from the organic solvent source 15. The solution 17 and the miscible organic solvent may be mixed with each other within the precipitation device 16, so that one or more of the salt species in the solution 17 precipitate to form a mixture of precipitate solids 18 and a liquid 19.

The solid-liquid separation unit 12 is in fluid communication with the precipitation unit 11 for receiving and separating the precipitate solids 18 and a portion of the liquid 19. The solid-liquid separation unit 12 is not limited to any particular device suitable for separation of the precipitate solids 18 and the portion of the liquid 19. Non-limiting examples of the solid-liquid separation unit 12 include one or more hydrocyclones, one or more centrifuges, one or more filter presses, one or more cartridge filters, one or more vacuum filtration devices, and one or more microfiltration devices.

In some applications, the solid-liquid separation unit 12 may comprise one or more hydrocyclones serially connected to each other. When the mixture of the precipitate solids 18 and the portion of the liquid 19 from the precipitation unit 11 is introduced into the solid-liquid separation unit 12, the precipitate solids 18 may be removed from the portion of the liquid 19.

For the arrangement illustrated in FIG. 1, the recovery unit 13 is in fluid communication with and receives the liquid 19 from the solid-liquid separation unit 12 and an upper portion (not labeled) of the precipitation device 16. The recovery unit 13 is configured to facilitate separation of the liquid 19, for example, to separate a liquid with different phases.

In some examples, the recovery unit 13 may comprise a vessel, in which the separation of the liquid 19 occurs. For example, the liquid 19 is heated and at least separated into an aqueous phase liquid 20 and an organic phase liquid 21 in the recovery unit 13. In other examples, the recovery unit 13 may comprise one or more membrane distillation devices for separation, so that the organic phase liquid 21 is separated from the aqueous phase liquid 20 and recovered. In some applications, the recovered miscible organic solvent may be reintroduced into the precipitation device 16 for facilitating the precipitation of the salt species in other solutions.

In certain applications, after the separation in the recovery unit 13, a portion of the miscible organic solvent is removed from the liquid 19. A certain amount of residual miscible organic solvent may still remain in the aqueous phase liquid 20, Accordingly, the aqueous phase liquid 20 from the recovery unit 13 may be introduced into the purification unit 14 for the separation of at least a portion of the residual miscible organic solvent from the aqueous phase liquid 20.

In the illustrated example, the purification unit 14 comprises a removal device 23. The removal device 23 may comprise any devices suitable for the separation of the residual miscible organic solvent from the aqueous phase liquid 20. In some examples, the removal device 23 may comprise one or more membrane devices employing one or more membranes to remove the residual organic solvent. Non-limiting examples of the one or more membrane devices may comprise one or more of one or more reverse osmosis devices, one or more nanofiltration devices, and one or more membrane distillation devices.

Thus, a fluid 22 comprising at least a portion of the residual organic solvent may be removed from the aqueous phase liquid 20, and a product liquid 24 may be produced. Alternatively, the removal device 23 may comprise one or more ion removal devices including, but not limited to one or more ion exchange resins, one or more reverse osmosis devices, one or more electrodialysis reversal devices, one or more membrane distillation devices, and one or more supercapacitor desalination devices.

In certain applications, the purification unit 14 may further comprise an ionization source 25 disposed upstream from and in fluid communication with the removal device 23 for providing one or more ionization materials to ionize the residual miscible organic solvent in the aqueous phase fluid 20. In non-limiting examples, the one or more ionization materials may comprise one or more pH adjustment materials. As a result, before the separation of the residual organic solvent in the removal device 23, the one or more pH adjustment materials may be introduced to adjust the pH values of the aqueous phase liquid 20 so as to ionize at least a portion of the residual organic solvent for facilitating the separation.

In some examples, the pH values of the aqueous phase liquid 20 may be reduced. The one or more pH adjustment materials may comprise one or more acids. Non-limiting examples of the one or more acids may comprise hydrochloric acids, sulphuric acids and other suitable acids. In certain applications, the removed residual miscible organic solvent may also be reintroduced into the precipitation unit 11.

Accordingly, due to the miscible organic solvents and the pH adjustment materials, the salt species and the miscible organic solvents may be removed from the solutions 17 respectively, so that the product liquid 24 is produced with high efficiency and low energy consumption.

For the arrangement illustrated in FIG. 1, in some embodiments, the treatment system 10 may comprise a pretreatment unit 26 disposed upstream from and in fluid communication with the precipitation device 16. In some examples, the pretreatment unit 26 may comprise a vessel and accommodate one or more pretreatment materials. When the solution 17 is introduced into the pretreatment unit 26, the one or more pretreatment materials in the pretreatment unit 26 may mix with the solution 17 to reduce the concentration of one or more ion species before the solution 17 is introduced into the precipitation unit 11. Additionally, a pretreatment source (not shown) may be provided separately from and provide the one or more pretreatment materials into the pretreatment unit 26.

In some embodiments, the one or more pretreatment materials may not be limited to any particular pretreatment materials, and may be selected based on different ion species in the solution 17. For example, the one or more pretreatment materials comprise one or more soluble materials having sulfate radical anions, for example sulphuric acid, so as to remove cations, such as barium cations and/or selenium cations in the solution 17 in the form of precipitates.

In certain applications, the treatment system 10 may further comprise one or more heat-exchanging apparatuses 27 disposed between the pretreatment unit 26 and the precipitation unit 11, between the solid-liquid separation unit 12 and the recovery unit 13, and/or between the recovery unit 13 and the purification unit 14 for thermal exchange. In some applications, the recovery unit 13 may be integrated with a heat-exchanging apparatus including, but not limited to a heater.

It should be noted that the arrangement shown in FIG. 1 is merely illustrative. For the illustrated embodiment, the precipitation device 16 and the solid-liquid separation unit 12 are provided separately. Alternatively, the precipitation device 16 and the solid-liquid separation unit 13 may be integrated to act as one element for performing the precipitation and the separation.

In other examples, the pretreatment unit 26 and/or the solid-liquid separation unit 12 may not be employed. The solution 17 may be directly introduced into the precipitation unit 11, so that the liquid 19 at the upper portion of the precipitation device 16 may be introduced into the recovery unit 13 after the salt species precipitate to settle down at a tower portion of the precipitation device 16.

Figure 2:
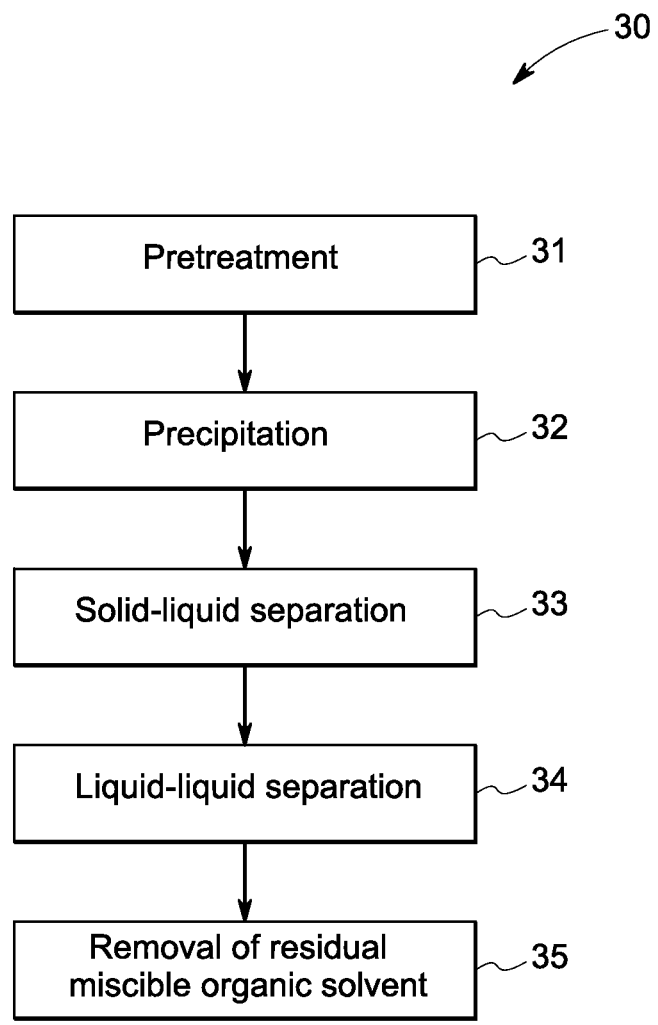
FIG. 2 is a schematic flow chart of a treatment process in accordance with one embodiment of the invention.

FIG. 2 is a schematic flow chart of a treatment process 30. As illustrated in FIGS. 1-2, during the treatment process, in step 31, a certain amount of the solution 17 and a certain amount of the pretreatment material are introduced into the pretreatment unit 26 to remove one or more ion species. In step 32, the solutions 17 are then delivered into the precipitation unit 11. A certain amount of the miscible organic solvent from the organic solvent source 15 are also introduced into the precipitation device 16 to mix with the solution 17, so that one or more salt species precipitate from the solutions 17 due to their lower solubility in the miscible organic solvent and form the mixture of the precipitate solids 18 and the liquid 19.

In step 33, the precipitate solids 18 and a portion of the liquid 19 is introduced into the solid-liquid separation unit 12 for separation. In step 34, after the separation of the precipitate solids 18 from the portion of the liquid 19, the liquid 19 from the precipitation unit 11 and the solid-liquid separation unit 12 is introduced into the recovery unit 13. In non-limiting examples, the liquid 19 may be heated to a higher temperature; so that the miscible organic solvent 21 is separated from the liquid 19 within the recovery unit 13 in the form of layers of the organic phase liquid 21 and the aqueous phase liquid 20.

Subsequently, in step 35, the aqueous phase liquid 20 is introduced into the purification unit 14 for separation of the residual miscible organic solvent 22 from the aqueous phase liquid 20. In one non-limiting example, a certain amount of the pH adjustment material may be mixed with and adjust the pH values of the aqueous phase liquid 20 from the recovery unit 13 so as to ionize the residual miscible organic solvent 22, so that the residual miscible organic solvent 22 is separated and recovered after passing through the purification unit 14. In non-limiting examples, the adjusted pH values of the aqueous phase liquid 20 may be about 4-5.

In some applications, the separated miscible organic solvent 21 in step 34 and/or the recovered residual miscible organic solvents 22 in step 35 may be reintroduced into the precipitation device 16. In other applications, one or more heat exchanging steps may be employed before the precipitation step 32, the solid-liquid separation step 33, the liquid-liquid separation step 34 and/or the recovery step 35.

In non-limiting examples, prior to the precipitation step 32, the solutions 17 may be cooled, for example, to about 0° C. for the subsequent precipitation step 32. The liquid-liquid separation step 34 may be performed at a higher temperature, such as about 70° C. Prior to the step 35, the aqueous phase liquid 20 from the recovery unit 13 may also be cooled, for example, to about 25° C. for the recovery step 35. Additionally, in certain applications, the pretreatment step 31 and/or the solid-liquid separation step 33 may not be employed.

Accordingly, in embodiments of the invention, due to the presence of the miscible organic solvent in the solution, the salt species may be removed with lower cost and higher efficiency. In addition, the residual miscible organic solvent may be readily removed with lower energy consumption via adjustment of the pH values of the aqueous phase liquid so as to produce the product liquid.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be through the spirit and scope of the disclosure as defined by the subsequent claims.

What is claimed is:

1. A treatment system, comprising:
a precipitation unit configured to treat a solution using one or more miscible organic solvents to produce a mixture of precipitate solids and a liquid;
a solid-liquid separation unit configured to receive the mixture of precipitate solids and liquid from the precipitation unit and to discharge a solids reduced liquid stream;
a recovery unit configured to receive the liquid stream from the solid-liquid separation unit and to facilitate separating the liquid stream at least into an organic phase liquid and an aqueous phase liquid comprising a portion of the one or more miscible organic solvents;
a purification unit comprising one or more membrane devices configured to receive the aqueous phase liquid comprising a portion of the one or more miscible organic solvents from the recovery unit and to separate at least a portion of the one or more miscible organic solvents from the aqueous phase liquid comprising a portion of the one or more miscible organic solvents; and,
a plurality of heat-exchanging devices at least disposed between the precipitation unit and the recovery unit and between the recovery unit and the purification unit.

2. The treatment system of claim 1, wherein the solution comprise a saline solution.

3. The treatment system of claim 1, wherein the precipitation unit comprises an organic solvent source and a precipitation device in fluid communication with the organic solvent source, and wherein the organic solvent source is configured to provide the one or more miscible organic solvents into the precipitation device, and the precipitation device is configured to accommodate the one or more miscible organic solvents and the solution for the precipitation of the precipitate solids.

4. The treatment system of claim 1, wherein the one or more membrane devices comprises one or more of one or more reverse osmosis devices, one or more nanofiltration devices, and one or more membrane distillation devices.

5. The treatment system of claim 4, wherein the one or more membrane devices comprise the one or more reverse osmosis devices.

6. The treatment system of claim 1, wherein the purification unit further comprises an ionization source configured to provide one or more ionization materials to ionize at least a portion of the one or more organic solvents in the aqueous phase liquid so that at least a portion of the one or more ionized organic solvents are removed using the one or more membrane devices.

7. The treatment system of claim 6, wherein the ionization source comprises a pH adjustment source configured to provide one or more pH adjustment materials to adjust pH values of the aqueous phase liquid so as to ionize at least the portion of the one or more residual miscible organic solvents.

8. The treatment system of claim 1, further comprising a pretreatment unit disposed upstream from and in fluid communication with the precipitation unit, and configured to remove one or more ion species in the solution.

9. A treatment system, comprising:
a precipitation unit configured to treat an solution using one or more miscible organic solvents to produce a mixture of precipitate solids and a liquid;
a recovery unit in fluid communication with the precipitation unit and configured to facilitate separating the liquid at least into an organic phase liquid and an aqueous phase liquid comprising a portion of the one or more miscible organic solvents;
a purification unit comprising an ionization source and a removal device in fluid communication with the recovery unit, wherein the ionization source is configured to provide one or more ionization materials to ionize at least a portion of the one or more organic solvents in the aqueous phase liquid, and the removal device is configured to receive the aqueous phase liquid to separate at least a portion of the one or more ionized residual miscible organic solvents from the aqueous phase liquid; and,
a plurality of heat-exchanging devices at least disposed between the precipitation unit and the recovery unit and between the recovery unit and the purification unit.

10. The treatment system of claim 9, wherein the precipitation unit comprises an organic solvent source and a precipitation device in fluid communication with the organic solvent source, and wherein the organic solvent source is configured to provide the one or more miscible organic solvents into the precipitation device, and the precipitation device is configured to accommodate the one or more miscible organic solvents and the solution for the precipitation of the precipitate solids.

11. The treatment, system of claim 9, wherein the one or more miscible organic solvents comprises one or more of isopropylamine, propylamine, acetone, methanol, ethanol, acetonitrile, diisopropylamine, tetrahydrofuran, tetrahydropyrimidine, N-methyltetrahydropyrimidine and dioxane.

12. The treatment system of claim 9, wherein the removal device comprises one or more ion removal devices, and wherein the one or more ion removal devices comprises one or more of one or more reverse osmosis devices, one or more electrodialysis reversal devices, one or more ion exchange resins, one or more membrane distillation devices, and one or more supercapacitor desalination devices.

13. The treatment system of claim 12, wherein the one or more ion removal devices comprises one or more of the one or more reverse osmosis devices and the one or more membrane distillation devices.

14. The treatment system of claim 9, wherein the ionization source comprises a pH adjustment source configured to provide one or more pH adjustment materials to adjust pH values of the aqueous phase liquid so as to ionize at least the portion of the one or more organic solvents residual in the aqueous phase liquid.

15. The treatment system of claim 14, wherein one or more pH adjustment materials comprise one or more of hydrochloric acid and sulphuric acid.

16. The treatment system of claim 9, further comprising a pretreatment unit disposed upstream from and in fluid communication with the precipitation unit, and configured to precipitate one or more ion species in the solution.

17. The treatment system of claim 9, wherein the solution comprises fracturing water.

18. A treatment process, comprising:
treating a solution using one or more miscible organic solvents to produce a mixture of precipitate solids and a liquid;
heating the liquid to a temperature effective to cause the liquid to separate into co-existing liquid layers including at least an organic phase liquid in one liquid layer and an aqueous phase liquid comprising a portion of the one or more miscible organic solvents in another liquid layer with a liquid-liquid interface between the organic phase liquid layer and the aqueous phase liquid layer; and introducing the aqueous phase liquid into a purification unit to separate at least a portion of the one or more miscible organic solvents in the aqueous phase liquid from the aqueous phase liquid.

19. The treatment process of claim 18, wherein the one or more miscible organic solvents comprises one or more of isopropylamine, propylamine, acetone, methanol, ethanol, acetonitrile, diisopropylamine, tetrahydrofuran tetrahydropyrimidine, N-methyltetrahydropyrimidine and dioxane.

20. The treatment process of claim 18, further comprising introducing one or more ionization materials into the aqueous liquid to ionize at least a portion of the one or more miscible organic solvents in the aqueous liquid so that at least a portion of the one or more ionized organic solvents are removed using the one or more of one or more membrane devices and one or more ion removal devices.

21. The treatment process of claim 20, wherein the one or more ionization materials comprise one or more pH adjustment materials to adjust pH values of the aqueous phase liquid so as to ionize at least the portion of the one or more organic solvents in the aqueous phase liquid.

22. The treatment process of claim 21, wherein the one or more pH adjustment materials comprise one or more of hydrochloric acid and sulphuric acid.

23. The treatment process of claim 18, wherein one or more of one or more reverse osmosis devices, one or more electrodialysis reversal devices, one or more membrane distillation devices, one or more nanofiltration devices, one or more ion exchange resins, and one or more supercapacitor desalination devices are employed to separate at least the portion of the one or more miscible organic solvents residual in the aqueous phase liquid from the aqueous phase liquid.

24. The treatment process of claim 18, further pretreating the solution to reduce concentrations of one or more ion species in the solution before the solution is treated using the one or more miscible organic solvents.

* * * * *

UNITED STATES PATENT AND TRADEMARK OFFICE
CERTIFICATE OF CORRECTION

PATENT NO. : 9,828,270 B2
APPLICATION NO. : 13/062857
DATED : November 28, 2017
INVENTOR(S) : Jiyang Xia et al.

Page 1 of 1

It is certified that error appears in the above-identified patent and that said Letters Patent is hereby corrected as shown below:

In the Claims

In Column 7, Line 62, Claim 9, please amend:
-- ... a precipitation unit configured to treat an solution using... --
And correct error to read:
-- ... a precipitation unit configured to treat a solution using... --

In Column 9, Line 11-12, Claim 20, please amend:
-- ... acqueous liquid to ionize at least a portion of the one or more... --
And correct error to read:
-- ... acqueous phase liquid to ionize at least a portion of the one or more... --

Signed and Sealed this
Tenth Day of April, 2018

Andrei Iancu
*Director of the United States Patent and Trademark Office*